United States Patent
Hasunuma

(10) Patent No.: US 7,100,454 B2
(45) Date of Patent: Sep. 5, 2006

(54) IN-LINE TYPE FLUID PRESSURE SENSOR

(75) Inventor: Masahiro Hasunuma, Gyoda (JP)

(73) Assignee: Surpass Industry Co. Ltd., Saitama (JP)

( * ) Notice: Subject to any disclaimer, the term of this patent is extended or adjusted under 35 U.S.C. 154(b) by 0 days.

(21) Appl. No.: 11/038,035

(22) Filed: Jan. 21, 2005

(65) Prior Publication Data

US 2005/0160828 A1 Jul. 28, 2005

(30) Foreign Application Priority Data

Jan. 23, 2004 (JP) ............................. 2004-016120

(51) Int. Cl.
*G01L 7/08* (2006.01)
(52) U.S. Cl. ....................................... 73/715
(58) Field of Classification Search ................... 73/715
See application file for complete search history.

(56) References Cited

U.S. PATENT DOCUMENTS

| 4,177,496 | A | | 12/1979 | Bell et al. | |
|---|---|---|---|---|---|
| 4,192,192 | A | | 3/1980 | Schnell | |
| 5,693,887 | A | * | 12/1997 | Englund et al. | ............... 73/723 |
| 5,852,244 | A | | 12/1998 | Englund et al. | |
| 5,869,766 | A | | 2/1999 | Cucci et al. | |
| 6,550,338 | B1 | * | 4/2003 | Rashidi | ....................... 73/715 |
| 6,622,564 | B1 | | 9/2003 | Imai et al. | |
| 6,640,639 | B1 | | 11/2003 | Okawa et al. | |

FOREIGN PATENT DOCUMENTS

| JP | 61197534 | 12/1986 |
|---|---|---|
| JP | 397639 | 1/1990 |
| JP | 2547038 | 4/1993 |
| JP | 5187941 | 7/1993 |
| JP | 6129927 | 5/1994 |
| JP | 2552093 | 3/1995 |
| JP | 7072029 | 3/1995 |

\* cited by examiner

*Primary Examiner*—Edward Lefkowitz
*Assistant Examiner*—George P. Bonanto
(74) *Attorney, Agent, or Firm*—Browdy and Neimark, PLLC

(57) ABSTRACT

In an in-line type fluid pressure sensor for determining the fluid pressure in flow of a fluid circulated through a fluid flow circuit employed in a semiconductor manufacturing apparatus, an inner wall surface located particularly in a downstream side connection port (6) of a body member (1) of the sensor is moderately inclined in contour in longitudinal section, which makes it possible for the fluid to flow through a fluid introduction portion (9a) of the body member (1) in a smooth manner without standing in flow in the fluid introduction portion (9a). Due to this, in such a fluid introduction portion (9a), there is not any fear of occurrence of the fluid flow standing phenomenon or problem at all. This makes it possible for the in-line type fluid pressure sensor to realize a precise measurement of the fluid pressure in flow of the fluid circulated through the fluid flow circuit.

8 Claims, 3 Drawing Sheets

HOLLOW PORTION

LIP

IN-LINE TYPE FLUID PRESSURE SENSOR

BACKGROUND OF THE INVENTION

1. Field of the Invention

The present invention relates to an in-line type fluid pressure sensor, and more particularly to an in-line type fluid pressure sensor, which is connected in-line in a fluid flow circuit of a chemically corrosive fluid or liquid to determine the pressure of the corrosive liquid in flow circulated through the fluid flow circuit.

2. Description of the Related Art

In a semiconductor manufacturing apparatus, an etching process of a semiconductor substrate is conducted using a chemical in liquid form, for example such as a liquid chemical comprising a hydrofluoric acid (HF) solution or the like. In order to supply such liquid chemical to the semiconductor manufacturing apparatus in a smooth manner, an in-line type fluid pressure sensor is incorporated in a liquid chemical's circulation circuit of the apparatus.

In view of harshness in corrosive action of the above liquid chemical, it is required for the in-line type fluid pressure sensor to protect its own fluid pressure receiving surface from such harsh corrosive action of the liquid chemical since the fluid pressure receiving surface of the fluid pressure sensor is exposed to the liquid chemical in operation. Due to this, heretofore various types of a protective or isolation member have been proposed and arranged in the fluid pressure sensor to meet the above requirement. More specifically, such an isolation member thus arranged in the fluid pressure sensor functions to prevent the pressure receiving surface of the sensor from making direct contact with the liquid chemical.

In general, the in-line type fluid pressure sensor is provided with an fluid introduction portion for introducing the object or fluid to be measured therein, wherein the fluid pressure receiving surface of the sensor is disposed in an inner end area of the fluid introduction portion of the sensor and brought into contact with the liquid chemical through the protective or isolation member. For example, the fluid introduction portion of the pressure sensor is constructed of: a hollow portion such as one disclosed in FIG. 3 of Japanese Utility Model Registration No. 2547038; or, a lip such as one disclosed in FIG. 4 of Published Japanese translations of PCT international publication for patent application No. Hei 11-512827 (published: Nov. 2, 1999).

As is clear from these FIGS. 3 and 4 of the prior art an inner wall of the fluid introduction portion of the conventional in-line type fluid pressure sensor is so formed as to be perpendicular to a direction in which the fluid flows in construction; and, the fluid flow circuit, in which the fluid pressure sensor is incorporated, has its fluid flow passage enlarged in cross-sectional area at the site of the fluid introduction portion of the fluid pressure sensor. Due to this, the fluid flow circulating through the circuit tends to stand in flow at the site of the fluid introduction portion of the pressure sensor. Such standing phenomenon in the fluid flow appearing in the fluid introduction portion of the sensor substantially makes it impossible for the in-line type fluid pressure sensor to realize a precise measurement of the fluid pressure in flow of the fluid circulated through the fluid flow circuit.

The other in-line types of conventional fluid pressure sensors are disclosed in the following prior arts, for example: Englund et al., in U.S. Pat. No. 5,693,887, which discloses a non-contaminating pressure sensor module having an isolation member; Englund et al., in U.S. Pat. No. 5,852,244, which discloses a non-contaminating pressure transducer module having an isolation member; Ducci et al., in U.S. Pat. No. 5,869,766, which also discloses a non-contaminating pressure transducer module having an isolation member; Imai in U.S. Pat. No. 6,622,564, which discloses a fluid pressure sensor provided with a diaphragm under which any standing phenomenon of the fluid flow is not observed; Okawa in U.S. Pat. No. 6,640,639, which discloses a fluid pressure sensor provided with a fluid pressure measuring portion composed of a resin; Schnell in U.S. Pat. No. 4,192,192, which discloses a diaphragm seal assembly for use with a fluid pressure responsive instrument; and, Sell et al., in U.S. Pat. No. 4,177,496, which discloses a capacitive type fluid pressure sensor or transducer comprising a pair of thin discs made from an insulator.

As described above, it is difficult for the conventional in-line type fluid pressure sensor to realize a precise fluid pressure measurement of the fluid at the site of the fluid introduction portion of the sensor since the conventional fluid pressure sensor suffers from the fluid flow standing phenomenon or problem appearing at the site of the fluid introduction portion of the fluid pressure sensor.

SUMMARY OF THE INVENTION

Under such circumstances, the present invention was made to solve the fluid flow standing problem inherent in the prior art. Consequently, it is an object of the present invention to provide an in-line type fluid pressure sensor, which is substantially free from any fear of the fluid flow standing problem occurring in the prior art and is therefore capable of realizing a precise measurement of the fluid pressure in flow of the fluid circulated through the fluid flow circuit.

In accordance with the present invention, the above object of the present invention is accomplished by providing:

An in-line type fluid pressure sensor comprising a body member (1) and a sensor module (2), wherein: the body member (1) is provided with an upstream-side connection port (5), a downstream-side connection port (6) and an upper portion; the upstream-side connection port (5) and the downstream side connection port (6) both are connected with a fluid flow passage (9) of a fluid flow circuit through which a fluid is circulated; the sensor module (2) is disposed in the upper portion of the body member (1); an intermediate portion of the fluid flow-passage (9) extending from the upstream-side connection port (5) to the downstream-side connection port (6) is moderately bent to form a fluid introduction portion (9a) of the body member (1), which introduction portion (9a) assumes a substantially inverted V-shaped form in longitudinal section of the fluid flow passage (9) so as to form an upper wall of the fluid flow passage (9) into the substantially inverted V-shaped form or into a divergent shape in contour in longitudinal section of the fluid flow passage (9), wherein an upper end portion of the fluid introduction portion (9a) forms an opening through which a fluid pressure receiving surface of the sensor module (2) is brought into contact with the fluid to realize a precise measurement of the fluid pressure of the fluid.

In the in-line type fluid pressure sensor of the present invention having the above construction, preferably: a protective sheet (15) constructed of a chemical-resistant member is fixedly mounted on the fluid pressure receiving surface of the sensor module (2) to make contact with the fluid; and, the opening of the fluid introduction portion (9a) of the body member (1) is fluid-tightly sealed by means of the protective sheet (15).

Further, preferably: in the opening of the fluid introduction portion (9a) of the body member (1), a diaphragm constructed of a chemical-resistant member is partially abutted on the fluid pressure receiving surface of the sensor module (2) to make contact with the fluid; and, the opening of the fluid introduction portion (9a) of the body member (1) is fluid-tightly sealed by means of the diaphragm.

Still further, preferably: the flow passage (9) in the upstream-side connection port (5) is substantially equal in cross-sectional area to the flow passage (9) in the downstream-side connection port (6) and also to the flow passage (9) in the fluid introduction portion (9a) of the body member (1); and, a bottom wall of the fluid introduction portion (9a) in the body member (1) has a partially raised portion (8) corresponding in location and inclination to the upper wall of the fluid introduction portion (9a) in the body member (1), whereby the f low passage (9) may keep its cross-sectional area constant in the fluid introduction portion (9a) of the body element (1).

Preferably: the upper wall of the fluid introduction portion (9a) in the body member (1) is provided with both an inlet corner portion (9b) and an outlet corner portion (9c); and, each of the inlet corner portion (9b) and the outlet corner portion (9c) is constructed of a curved surface.

Further: the raised portion (8) of the fluid introduction portion (9a) in the body member (1) is provided with both a beginning end portion (8a) and a terminating end portion (8b); and, each of the beginning end portion (8a) and the terminating end portion (8b) of the raised portion (8) is constructed of a curved surface.

Still further, preferably: the body member (1) is provided with a cylindrical holder receiving portion (10) in its upper surface; and, the sensor module (2) is received in the cylindrical holder receiving portion (10) of the body member (1).

Preferably: the sensor module (2) is received in the cylindrical holder receiving portion (10) of the body member (1) through a sensor holder (11); and, the sensor holder (11) is threadably engaged with the cylindrical holder receiving portion (10) of the body member (1) and received therein.

Further, preferably an O-ring is mounted between an inner peripheral surface of the sensor holder (11) and an outer peripheral surface of the sensor module (2).

Still further, preferably a sensor retaining member (14) for pressing the sensor module (2) from above in the sensor holder (11) so as to retain the sensor module (2) in the sensor holder (11) is threadably engaged with the sensor holder (11).

Preferably: a cylindrical shielding casing (17) is mounted on the body member (1) so as to cover an area extending from the sensor holder (11) to the holder receiving portion (10) of the body member (1); and, a body cap member (3) is mounted on the body member (1) through the cylindrical shielding casing (17).

As described above, according to the present invention, since the inner wall surface located particularly in the downstream-side connection port (6) is moderately inclined in configuration, it is possible for the fluid circulated through the fluid flow circuit to flow through the fluid introduction portion (9a) of the body member (1) in a smooth manner without causing any flow standing of the fluid in the fluid introduction portion (9a) of the body member (1) Due to this, in the fluid introduction portion (9a) of the body member (1) used in the in-line type fluid pressure sensor of the present invention, there is not any fear of occurrence of the fluid flow standing phenomenon or problem at all. This makes it possible to realize a precise measurement of the fluid pressure in flow of the fluid circulated through the fluid flow circuit employed in the semiconductor manufacturing apparatus, for example.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 1:
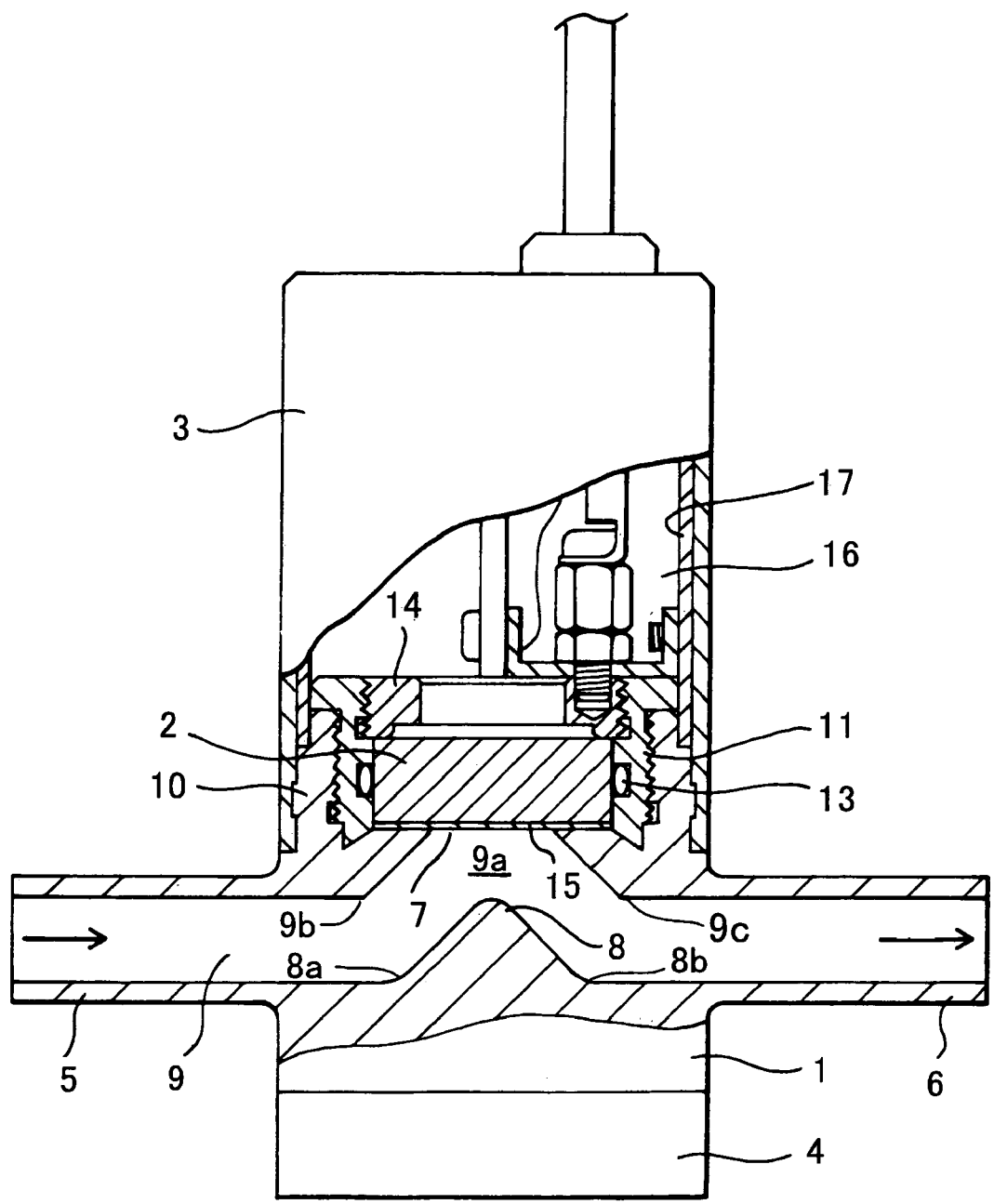
FIG. 1 is a longitudinal sectional view of a first embodiment of the in-line type fluid pressure sensor of the present invention.

FIG. 1 shows a longitudinal sectional view of a first embodiment of an in-line type fluid pressure sensor of the present invention for precisely determining the fluid pressure of a fluid such as chemically corrosive fluid or liquid, which is circulated through a fluid flow circuit (not shown) used in a semi-conductor manufacturing apparatus (not shown), for example. In use, the in-line type fluid pressure sensor of the present invention, is connected in-line in the fluid flow circuit to precisely determine the pressure of the fluid in flow circulated through the fluid flow circuit.

As shown in FIG. 1, the first embodiment of the in-line type fluid pressure sensor of the present invention is provided with: a body member 1; a sensor module 2 mounted in an upper surface of the body member 1; and, a body cap 3 for covering the upper surface of the body member 1.

The body member 1 is provided with: a base portion 4 in its lower end portion; an upstream-side connection port 5 connected with a fluid passage 9 of the fluid flow circuit (not shown) in an upstream side of the body member 1; and, a downstream-side connection port 6 connected with the fluid passage 9 of the fluid flow circuit (not shown) in a downstream side of the body member 1.

As viewed in FIG. 1, the fluid passage 9 extends from the upstream-side connection port 5 to the downstream-side connection port 6, and is moderately bent upward to assume a substantially inverted V-shaped form in contour in longitudinal section in the vicinities of a central portion of the body member 1.

A fluid introduction portion 9a of the body member 1 corresponds in location to the inverted V-shaped form of the fluid passage 9, and is oppositely disposed from a sensor module 2. As shown in FIG. 1, an upper end portion of the fluid introduction portion 9a of the fluid pressure sensor is opened upwardly to form an opening 7. In other words, an upper wall surface of the fluid introduction portion 9a of the fluid pressure sensor assumes a downwardly flared shape in contour of its longitudinal section, as viewed in FIG. 1.

Such an upper wall surface of the fluid introduction portion 9a in the pressure sensor is provided with: an inlet corner portion 9b in the upstream side of the base member 1; and, an outlet corner portion 9c in the downstream side of the base member 1. Preferably, each of these corner portions 9b, 9c is constructed of a moderately curved surface in order to permit the fluid passing through the flow passage 9 to flow through these corner portions 9b, 9c in a smooth manner.

Further, as is clear from FIG. 1, in order to have the fluid introduction portion 9a of the flow passage 9 equal in cross-sectional area to the other portion of the flow passage 9, preferably a bottom wall of the fluid introduction portion 9a in the flow passage 9 has a partially raised portion 8, which corresponds in location and inclination to the upper wall of the fluid introduction portion 9a in the body member 1.

Such a partially raised portion 8 of the fluid introduction portion 9a in the body member 1 is provided with both a beginning end portion 8a and a terminating end portion 8b. Preferably, each of the beginning end portion 8a and the terminating end portion 8b of the raised portion 8 in the flow passage 9 is constructed of a moderately curved surface in order to ensure that the fluid passes through the raised portion 8 of the flow passage 9 in a smooth manner.

Formed in an upper surface of the body member 1 is a holder receiving portion 10 assuming a cylindrical shape for receiving therein a sensor holder 11. This holder 11 in turn receives the sensor module 2 therein, as shown in FIG. 1. The holder receiving portion 10 of the body member 1 has its inner peripheral surface threaded to form a female screw therein. On the other hand, the sensor holder 11 has its outer peripheral surface threaded to form a male screw therein. In assembly, the male screw of the sensor holder 11 is threadably engaged with the female screw of the holder receiving portion 10 of the body member 1, so that the sensor holder 11 is fixedly mounted in the holder receiving portion 10 of the body member 1 from above, as viewed in FIG. 1.

Fixedly mounted in the sensor holder 11 in an insertion manner is the sensor module 2. An O-ring 13 is interposed between an inner peripheral surface of the sensor holder 11 and an outer peripheral surface of the sensor module 2 to establish a fluid-tight oil seal between the sensor holder 11 and the sensor module 2.

A sensor retaining member 14 for pressing said sensor module 2 from above in the sensor holder 11 so as to retain the sensor module 2 in the sensor holder 11 is threadably engaged with an upper portion of the sensor holder 11.

As is clear from FIG. 1, an isolation or protective sheet 15, which is constructed of a chemical-resistant member, is fixedly mounted on a bottom surface of the sensor module 2 to make contact with the fluid. The opening of the fluid introduction portion 9a of the body member 1 is fluid-tightly sealed by means of the protective sheet 15. In the above construction, the bottom surface of the sensor module 2 serves as a fluid pressure receiving surface in operation. Consequently, in this case, the fluid pressure exerted by the fluid or liquid chemical passing through the flow passage 9 is transmitted to the fluid pressure receiving surface or bottom surface of the sensor module 2 through the protective sheet 15. As for the sensor module 2, this module 2 may be constructed of a capacitive type fluid pressure transducer or a piezoelectric type fluid pressure transducer.

Figure 2:
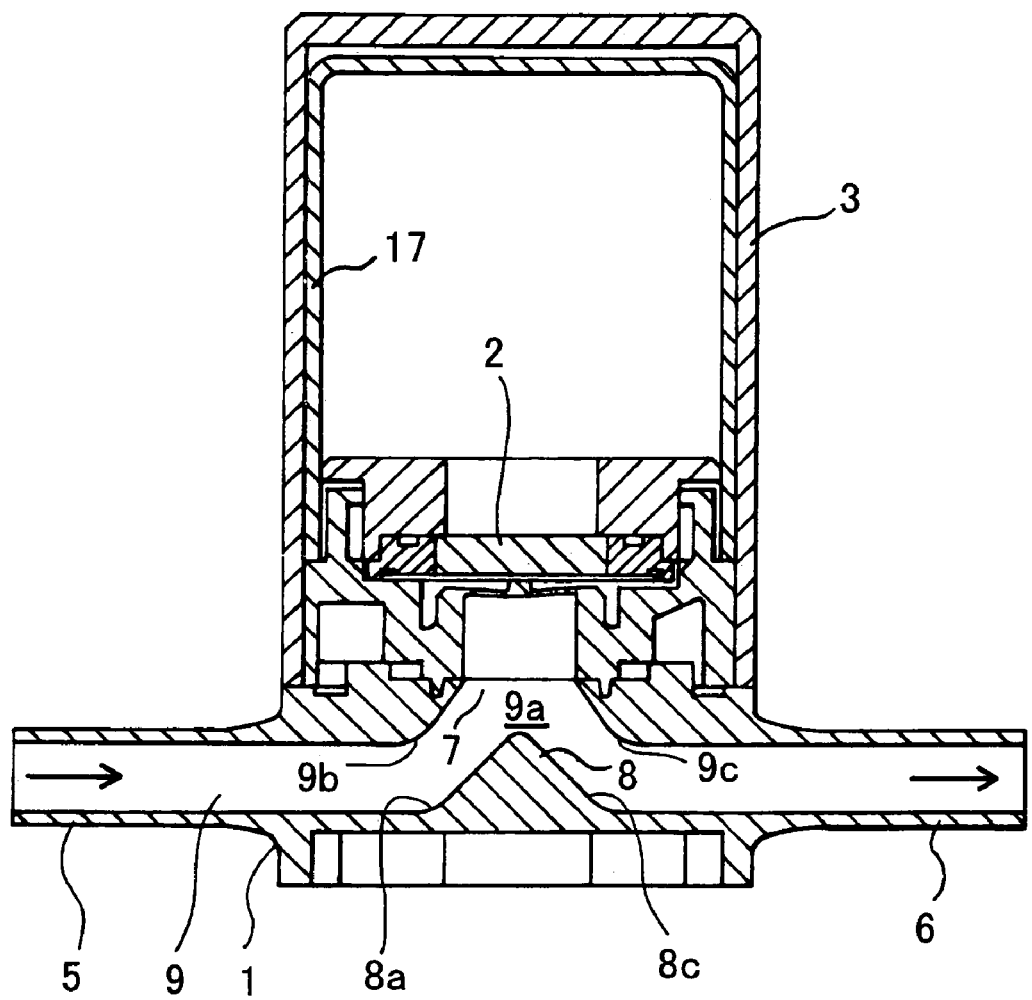
FIG. 2 is a longitudinal sectional view of a second embodiment of the in-line type fluid pressure sensor of the present invention.
Figure 3:
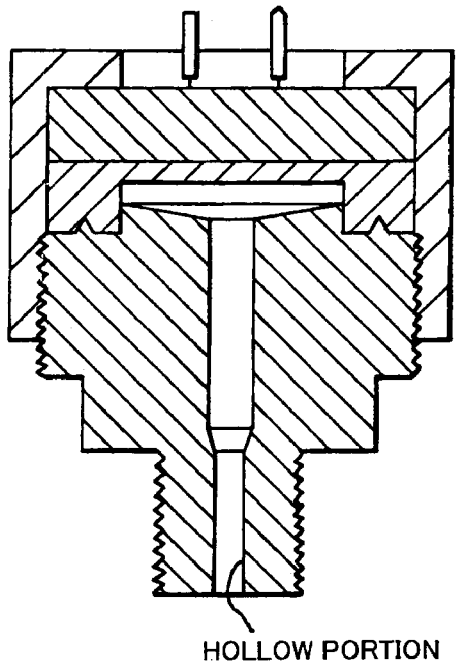
FIG. 3 is a longitudinal sectional view of a conventional type of the fluid pressure sensor, illustrating one of the conventional fluid introduction portions of the fluid pressure sensor.
Figure 4:
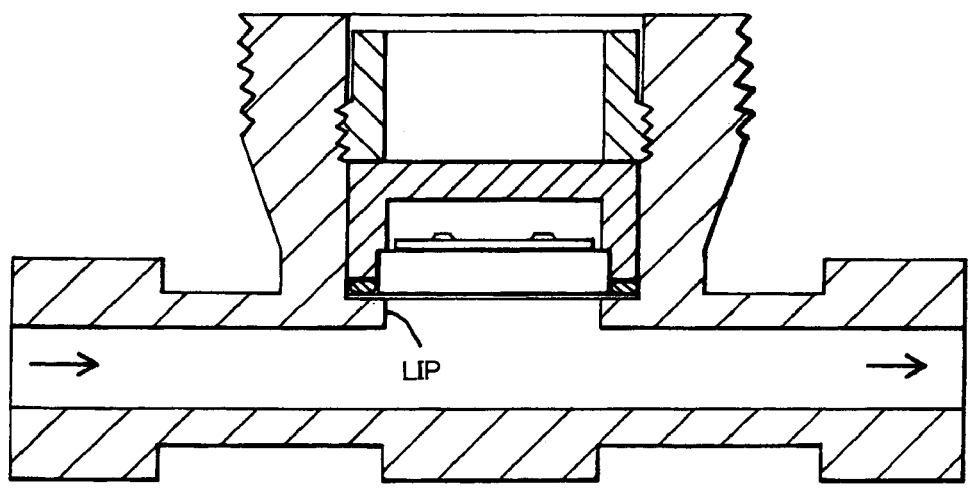
FIG. 4 is a longitudinal sectional view of another conventional type of the fluid pressure sensor, illustrating another one of the conventional fluid introduction portions of the fluid pressure sensor.

FIG. 2 shows a longitudinal sectional view of a second embodiment of the in-line type fluid pressure sensor of the present invention, illustrating a diaphragm used in place of the protective sheet 15 of the first embodiment.

In the second embodiment shown in FIG. 2, as is in the case of the first embodiment shown in FIG. 1, the cylindrical shielding casing 17 is mounted on the body member 1 so as to cover the area extending from the sensor holder 11 to the holder receiving portion 10 of the body member 1. On the other hand, the cylindrical body cap member 3 is mounted on the body member 1 through the cylindrical shielding casing 17. Incorporated in this shielding casing 17 is a signal output circuit 16 through which an electrical signal issued from the sensor module 2 is transmitted to an external instrument (not shown) used in the semiconductor manufacturing apparatus, for example. Such an external instrument and the details in construction of the signal output circuit 16 are omitted in the drawings since these components do not relate to the gist of the present invention.

In operation of the in-line type fluid pressure sensor of the present invention having the above construction, the fluid such as a liquid chemical passes through the upstream-side connection port 5 to enter the flow passage 9, and is guided upward along the surface of the raised portion a of the flow passage 9 to enter the fluid introduction portion 9a of the flow passage 9. After that, the fluid passes through the area of the opening 7 in the fluid introduction portion 9a to enter the downstream-side connection port 6 from which the fluid is returned to the fluid flow circuit of the semiconductor manufacturing apparatus, for example.

When the fluid passes through the area of the opening 7 in the fluid introduction portion 9a of the flow passage 9, the pressure receiving surface of the sensor module 2 receives the fluid pressure through the protective sheet 15, wherein the fluid pressure is exerted by the fluid passing through the area of the opening 7. This makes it possible for the sensor module 2 of the in-line type fluid pressure sensor of the present invention to realize a precise measurement of the fluid pressure of the fluid circulated through the fluid flow circuit.

In measuring the fluid pressure, since the inner wall surface of the fluid introduction portion 9a of the flow passage 9 particularly the inner wall surface of the downstream-side connection port 6 is moderately inclined in contour in longitudinal section of the port 6, it is possible for the fluid to flow along such moderately inclined surface of the port 6 in a smooth manner without any fear of fluid flow standing in the fluid introduction portion 9a of the flow passage 9.

While the present invention has been particularly shown and described in detain with reference to the preferred embodiments thereof, it will be understood by those skilled in the art that various changes or modifications in form and details may be made therein without departing from the spirit and scope of the present invention as defined by the appended claims.

Finally, the present application claims the Convention Priority based on Japanese Patent Application No. 2004-16120 filed on Jan. 23, 2004, which is herein incorporated by reference.

What is claimed is:

1. An in-line type fluid pressure sensor comprising a body member (1) and a sensor module (2), wherein: said body member (1) is provided with an upstream-side connection port (5), a downstream-side connection port (6) and an upper portion; said upstream-side connection port (5) and said downstream-side connection port (6) both are connected with a fluid flow passage (9) of a fluid flow circuit through which a fluid is circulated; said sensor module (2) is disposed in said upper portion of said body member (1); an intermediate portion of said fluid flow passage (9) extending from said upstream-side connection port (5) to said downstream-side connection port (6) is moderately bent to form a fluid introduction portion (9*a*) of said body member (1), which introduction portion (9*a*) assumes a substantially inverted V-shaped form in contour in longitudinal section of said fluid flow passage (9) so as to form an upper wall of said fluid flow passage (9) into said substantially inverted V-shaped form or into a divergent shape in contour in longitudinal section of said fluid flow passage (9), wherein an upper end portion of said fluid introduction portion (9*a*) forms an opening through which a fluid pressure receiving surface of said sensor module (2) is brought into contact with said fluid to realize a precise measurement of fluid pressure of said fluid;

said flow passage (9) in said upstream-side connection port (5) is substantially equal in cross-sectional area to said flow passage (9) in said downstream-side connection port (6) and also to said flow passage (9) in said fluid introduction portion (9*a*) of said body member (1) by having a partially raised portion (8) on a bottom wall of said fluid introduction portion (9*a*) in said body member (1) corresponding in location and inclination to said upper wall of said fluid introduction portion (9*a*) in said body member (1); said upper wall of said fluid introduction portion (9*a*) in said body member (1) is provided with both an inlet corner portion (9*b*) and said outlet corner portion (9*c*) is constructed of a curved surface; said raised portion (8) of said fluid introduction portion (9*a*) in said body member (1) is provided with both a beginning end portion (8*a*) and a terminating end portion (8*b*); and, each of said beginning end portion (8*a*) and said terminating end portion (8*b*) of raised portion (8) is constructed of a moderately curved surface.

2. The in-line type fluid pressure sensor as set forth in claim 1, wherein: a protective sheet (15) constructed of a chemical-resistant member is fixedly mounted on said fluid pressure receiving surface of said sensor module (2) to make contact with said fluid; and, said opening of said fluid introduction portion (9*a*) of said body member (1) is fluid-tightly sealed by means of said protective sheet (15).

3. The in-line type fluid pressure sensor as set forth in claim 1, wherein: in said opening of said fluid introduction portion (9*a*) of said body member (1), a diaphragm constructed of a chemical-resistant member is partially abutted on said fluid pressure receiving surface of said sensor module (2) to make contact with said fluid; and, said opening of said fluid introduction portion (9*a*) of said body member (1) is fluid-tightly sealed by means of said diaphragm.

4. The in-line type fluid pressure sensor as set forth in claim 1, wherein: said body member (1) is provided with a cylindrical holder receiving portion (10) in its upper surface; and, said sensor module (2) is received in said cylindrical holder receiving portion (10) of said body member (1).

5. The in-line type fluid pressure sensor as set forth in claim 4, wherein: said sensor module (2) is received in said cylindrical holder receiving portion (10) of said body member (1) through a sensor holder (11); and, said sensor holder (11) is threadably engaged with said cylindrical holder receiving portion (10) of said body member (1) and receiving therein.

6. The in-line type pressure sensor as set forth in claim 4, wherein an O-ring is mounted between an inner peripheral surface of said sensor holder (11) and a outer peripheral surface of said sensor module (2) to establish a fluid-tight seal therebetween.

7. The in-line type pressure sensor as set forth in claim 5, wherein: a sensor retaining member (14) for pressing said sensor module (2) from above in said sensor holder (11) so as to retain said sensor module (2) in said sensor holder (11) is threadably engaged with said sensor holder (11).

8. The in-line type pressure sensor as set forth in claim 5, wherein: a cylindrical shielding casing (17) is mounted on said body member (1) so as to cover an area extending from said sensor holder (11) to said holder receiving portion (10) of said body member (1); and, a body cap member (3) is mounted on said body member (1) through said shielding casing (17).

* * * * *